United States Patent [19]

Fechalos et al.

[11] Patent Number: 4,519,072
[45] Date of Patent: May 21, 1985

[54] ANSWER SUPERVISION SYSTEM

[75] Inventors: William A. Fechalos, Naperville; Joseph M. DeMarco, Elmhurst, both of Ill.

[73] Assignee: Rockwell International Corporation, El Segundo, Calif.

[21] Appl. No.: 440,690

[22] Filed: Nov. 10, 1982

[51] Int. Cl.³ .............................................. H04Q 11/04
[52] U.S. Cl. ................................ 370/110.1; 179/84 VF; 370/110.3
[58] Field of Search .............................. 370/85, 110.1; 340/825.64; 179/2 DP, 2 A, 5 R, 5 P, 18 FA, 6.02, 84 VF

[56] References Cited

U.S. PATENT DOCUMENTS 3,852,718 12/1974 DeLyria ..................... 340/825.64
4,041,458 8/1977 Gravdahl .................... 340/825.64
4,152,548 5/1979 Horiki ........................ 370/110.1
4,167,004 9/1979 Schenck et al. .............. 340/825.64
4,354,264 10/1982 Wurst ......................... 370/110.1
4,370,525 1/1983 Francis ...................... 179/18 FA
4,405,833 9/1983 Cave et al. ..................... 179/5 R
4,435,803 3/1984 Das et al. .................... 370/110.1
4,439,639 3/1984 Munter ...................... 179/84 VF Primary Examiner—Douglas W. Olms
Assistant Examiner—Wellington Chin
Attorney, Agent, or Firm—Carmen B. Patti; V. Lawrence Sewell; H. Fredrick Hamann

[57] ABSTRACT

This disclosure depicts a telecommunication supervision system, such as a supervisory progress signal detector, for evaluating the status of an input signal from a communication channel. An output channel is outputted when the input signal exceeds the threshold reference, and the channel signal is analyzed to determine the identity of the particular cadence of the input signal.

14 Claims, 3 Drawing Figures

ANSWER SUPERVISION SYSTEM

BACKGROUND OF THE INVENTION

This invention relates in general to a telecommunication supervision system, such as supervisory progress signal detectors for use with a telephone switching system, and, in particular, to a detector which identifies one of a number of different possible states of a telephone channel.

FIG. 1 broadly illustrates, in block diagram form, a typical arrangement for providing long distance telephone service by way of one of many telephone switching and carrier systems.

Typically in originating a telephone call, subscriber 9 dials a 7 digit access code into the system central office (CO) 10. This seven digit code particularly identifies the local system 12. Subscriber number 9 receives acknowledgement for service from the system 12. The local system 12 returns acknowledgement via the control office 10 to the originating dialer. The subscriber 11 then dials an authorization code which is recognized by the local system 12 as a request to be connected to a second telephone set.

The output ports of the local system 12 interconnect with various other systems 14 and central office 16. The latter of which is directly connected to a multiplicity of telephone users 18. In completing a talking path between subscriber 11 and subscriber 20, the local system 12 out-pulses the telephone number of subscriber 20 to the central office 22, which office then establishes a network connection between the subscriber 20 and the local system 12.

The problem involved and the problem which the present invention is contemplated to resolve, resides in the fact that central office 22 does not return answer supervision identifications of the local system 12 other than those audibly heard by a telephone user.

Therefore, for efficient detection of the line status, apparatus within the local system 12 must be able to detect the following:
1. Busy tone;
2. Reorder tone;
3. Ring-back tone;
4. Speech;
5. Silence;
6. Dial tone.

The immediate detection of these various statuses is necessary in order for the local system 12 to commence billing subscriber 9 for the use of the communication path.

In general, current telephone busses within the local system 12 have 96 channels utilizing pulse code modulation (PCM). A low-level multiplexer strobes various analog-digital-analog circuits for proper placement of information within the 96 channel time slots.

SUMMARY OF THE INVENTION

The present invention involves a telecommunication supervision system, such as a supervisory progress signal detector, for use with a multi-channel pulse code modulated bus. The bus has one or more different detectable pulse code modulated signals. One or none of the detectable signals appearing on one or more channels of the bus. The detectable pulse code modulated signals have a series of bits. The detector comprises a microprocessor means and a threshold detector means. The threshold detector means receives the detectable signals from the channels of the bus and receives a threshold reference signal from the microprocessor means for comparing the detectable signals to the threshold reference signal. The threshold detector means outputs a channel signal when a detectable signal appears on a channel during a channel sample and exceeds the reference signal. The detector further comprises a counter means receiving the channel signals from the threshold detector for counting at least some of the number of the detectable signals on each of the channels which rise above the threshold reference signal. The counter means has first and second outputs. The detector also comprises a dual port memory means which has first and second inputs for storing the counted number of the detectable signals on each of the channels during a collection interval. The first input is connected to the first output of the counter means, and the second input is connected to the second output of the counter means. The dual port memory means is also operatively connected to the microprocessor means. A timing means causes only the first input to receive during a first collection interval, and causes only the second input to receive during a second collection interval. The microprocessor means analyzes the counted number of detectable signals of each channel contained in one of the first or second memory units of the dual port memory means, while the other of the memory units receives from one of the first or second outputs of the counter means. The microprocessor means identifies the particular detectable signal on each of the channels of the multi-channel bus for one or more collection intervals, as well as identifying the absence of a detectable signal.

The present invention also includes a method of supervising the detectable pulse code modulated signals on the bus. The method is utilized by the above described circuit.

OBJECTS OF THE INVENTION

It is a primary object of the present invention to provide a telecommunication supervision system, such as a supervisory progress signal detector which is capable of identifying any one of a number of different possible states of a telephone channel.

It is another object of the present invention to provide a detector which utilizes circuitry to monitor pulse code modulated signals within a local system network.

It is a further object of the invention to provide a circuit which is able to monitor 96 channels on a pulse code modulated bus.

It is a further object of the invention to provide a system which is effective yet economical to manufacture.

It is yet another object of the present invention to provide a method of telecommunication supervision.

BRIEF DESCRIPTION OF THE DRAWINGS

The features of the present invention which are believed to be novel are set forth with particularity in the appended claims. The invention, together with further objects and advantages may best be understood by reference to the following description taken in conjunction with the accompanying drawings, in several figures of which like reference numerals identify like elements, and in which.

DESCRIPTION OF THE PREFERRED EMBODIMENT

Figure 1:
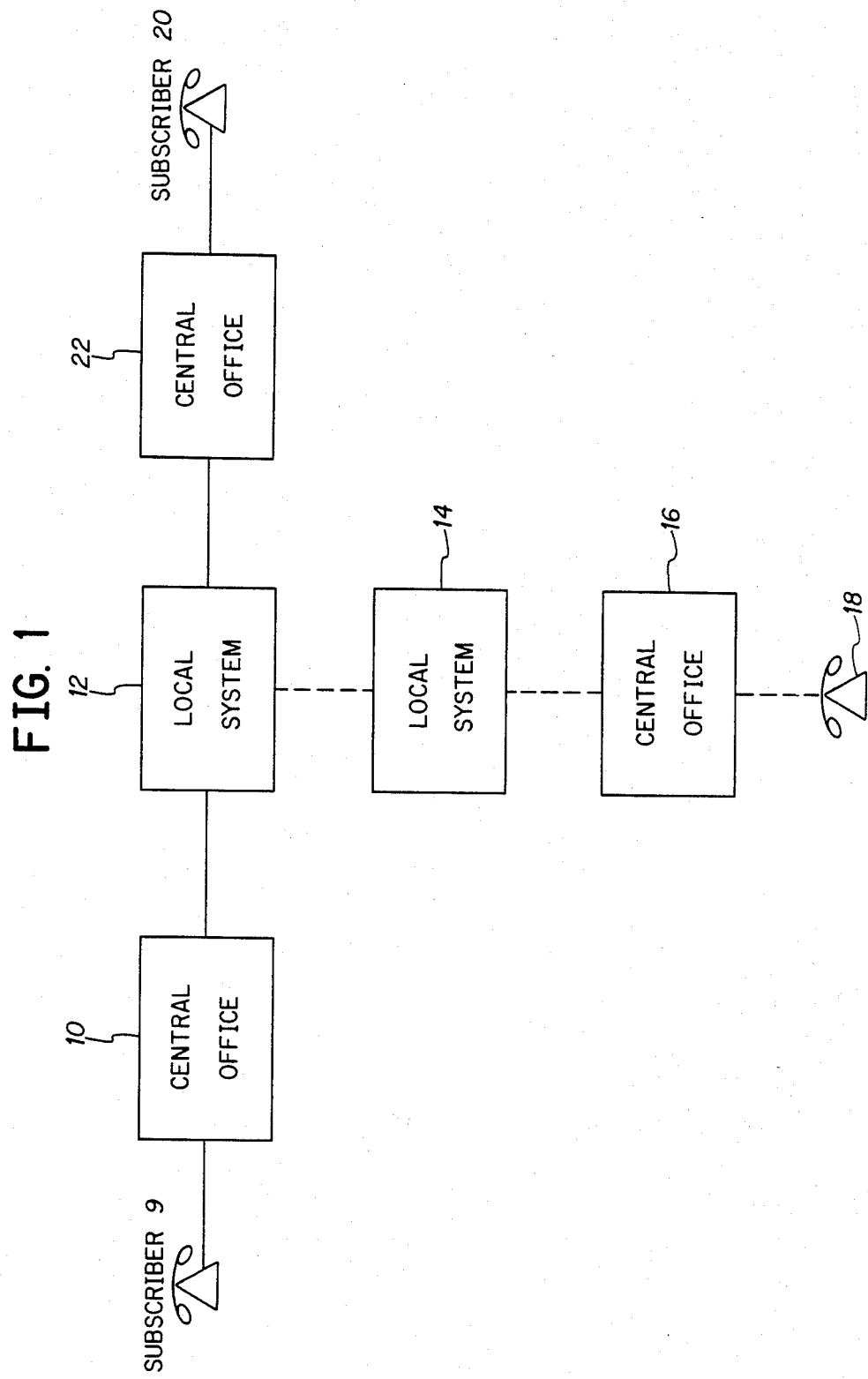
FIG. 1 is a block diagram of a typical telephone interconnection system.

Whereas the invention may be utilized in various applications, the telecommunication supervision system is preferably embodied in a supervisory progress signal detector for use with a multi-channeled pulse code modulated bus. The detector is utilized to detect the status of any one of a number of many different states on a channel of the bus. The bus may have a number of different channels. In a typical pulse code modulated bus within a local telephone system, the bus has 96 channels. The present invention is concerned with determining one of many different states which may occur in any one of the different channels.

One consideration to be resolved is the level at which these various states or conditions may be expected to be when received by a local system. Based upon the fact that the local system guarantees no more than a 5 db loss within its equipment, the worst case signal level appearing is determined to be the following:

A. Busy tone —26 db;
B. Reorder tone —21 db;
C. Ring-back tone —23 db;
D. Quiet tone —67 db;
E. Speech signal —12 db;
F. Dial tone —26 db.

Based on the foregoing, an arbitrary level of —45 db was chosen such that anything less than that level can be considered noise. The arbitrary level corresponds to a level which establishes a noise threshold such that any digital value less than the threshold is considered noise, and anything greater than the threshold is considered an audible tone or voice signal.

Another consideration is the cadence of various tones. The following are the interruptions per minute (IPM) uniquely associated with each tone:

A. Busy tone—60 IPM
B. Reorder—120 IPM
C. Ring-back—1–3 seconds or 2–4 seconds (On-Off)
D. Voice—No cadence;

In general terms, the present invention involves a supervisory progress signal detector for use with a multi-channel pulse code modulated bus. The bus has one or more different detectable pulse code modulated signals, one or none of the detectable signals appearing on one or more channels of the bus. The detectable pulse code modulated signals have a series of bits.

The detector comprises a microprocessor means and a threshold detector means. The threshold detector means receives the detectable signals from the channels of the bus and receives the threshold reference signal for the microprocessor means for comparing the detectable signals to the threshold reference signal. The threshold detector means outputs a channel signal when a detectable signal appears on a channel during a collection interval and exceeds the threshold reference signal. The detector further comprises a counter means receiving the channel signals from the threshold detector for counting the detectable signals on each of the channels which rise above the threshold reference signal during a collection interval. The counter means has first and second outputs.

The detector also comprises a dual port memory means which has first and second inputs for storing the counted number of detectable signals which rise above the threshold reference signal on each of the channels during a collection interval. The first input is connected to the first output of the counter means, and the second input is connected to the second output of the counter means. The dual port memory means is also operatively connected to the microprocessor means.

The detector further comprises a timing means including a timer and collection memory configuration control which causes only the first input to receive during a first collection interval and causes only the second input to receive during a second collection interval.

The microprocessor means analyzes the counted number of detectable signals of each channel contained in one of the first or second memory units of the dual port memory means, while the other of the memory units receives from one of the first or second outputs of the counter means. The detectable signals are outputs of the threshold detector and are indications of energy present. The microprocessor means identifies the particular detectable signal on each of the channels of the multi-channel bus for one or more collection intervals, as well as identifying the absence of a detectable signal.

Figure 2:
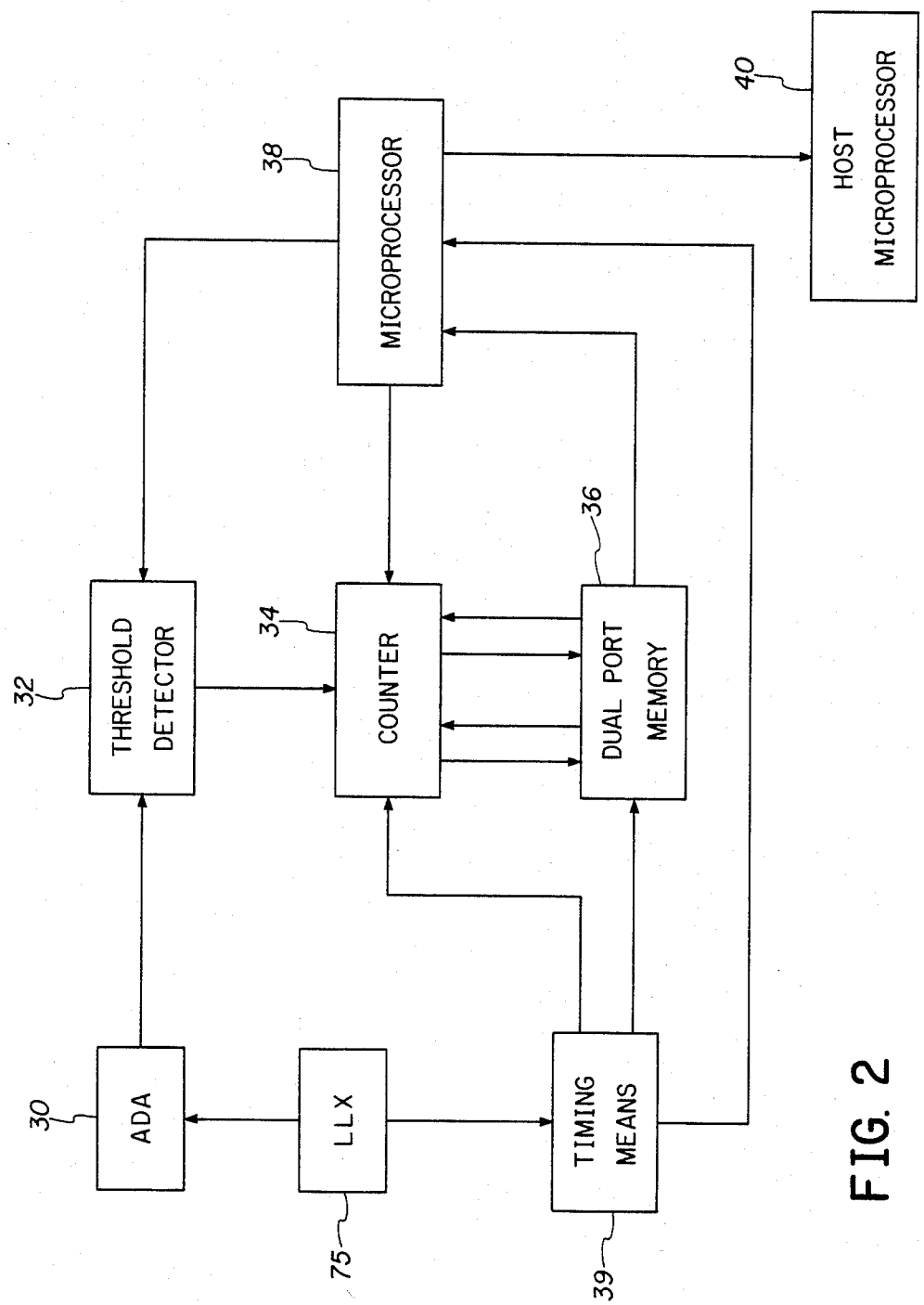
FIG. 2 is a block diagram of the present invention utilized with the FIG. 1 telephone system.

The preferred embodiment will now be described. FIG. 2 illustrates in block diagram form, a supervisory progress signal detector. A 96-channel bus within the local system analog-digital-analog converters 30 is a convenient and appropriate place within the system to implement the circuitry to monitor PCM words for detection of the various tones. In FIG. 2, a threshold detector 32 monitors the 96 channels of the bus at the output of the analog-digital-analog convertor 30. A counter means 34 receives signals from the threshold detector 32. The counter means 34 operatively interfaces with a dual port memory 36. A microprocessor 38 operatively interfaces a threshold detector 32, the counter means 34, and the dual port memory 36. A timing means 39 determines the collection interval and informs the microprocessor 38 when a collecting interval is completed. Analyzed results of the microprocessor 38 are transmitted to the host microprocessor 40.

The threshold detector 32 in the preferred embodiment is a standard digital comparator for comparing digital signals. The digital signals are the detectable pulse code modulated signals and the threshold reference signals.

Figure 3:
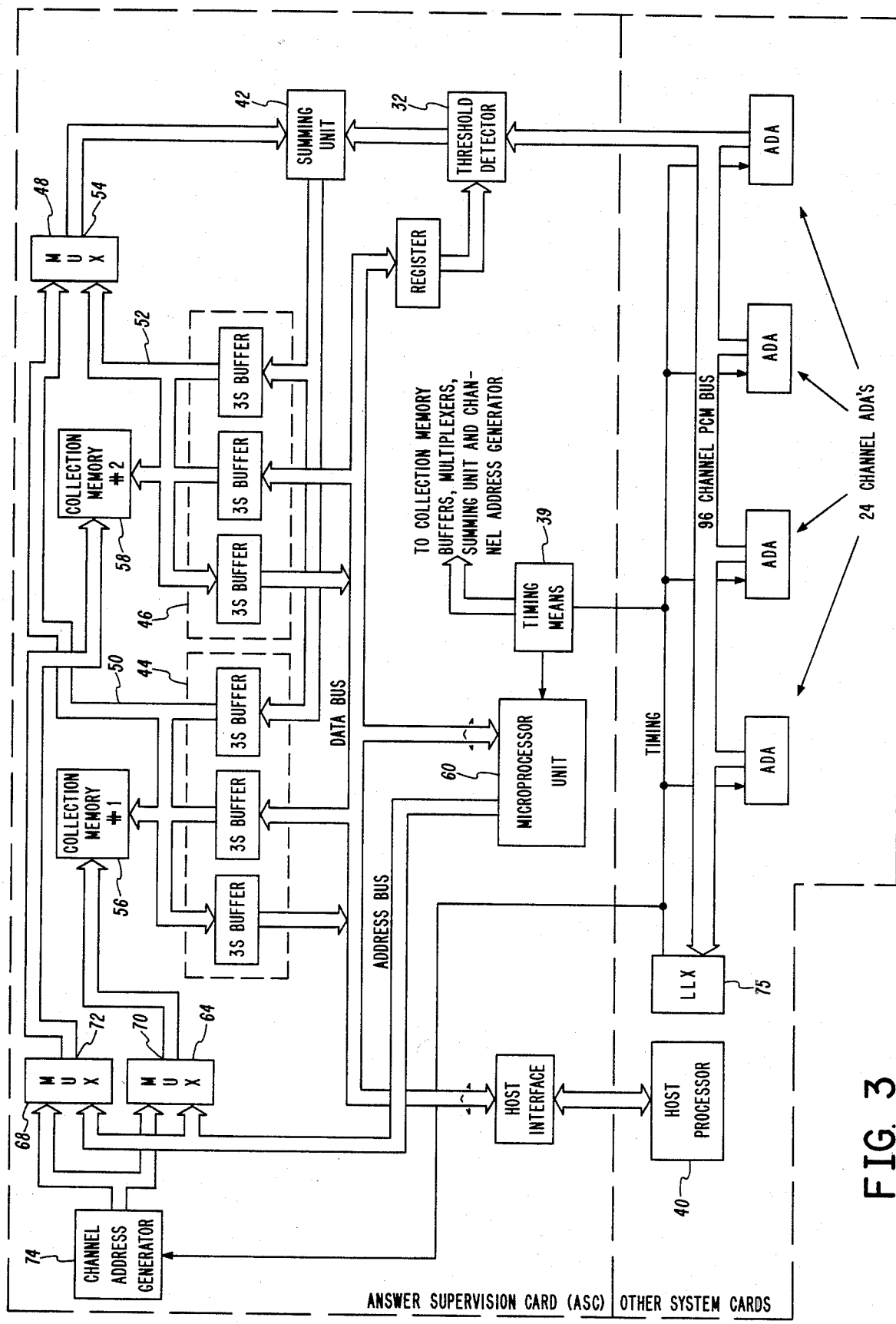
FIG. 3 is a detailed block diagram of the FIG. 2 block diagram.

The counter means 34 comprises a summing means or unit 42 as shown in FIG. 3 for receiving the channel signals. The counter means 34 further comprises first and second tri-state buffers 44 and 46 operatively connected to said summing unit 42 and to the microprocessor 38. The counter means 34 further comprises a multiplexer 48 operatively connected to an output 50, and 52 of each of the first and second tri-state buffers 44 and 46. The multiplexer 48 has an output 54 connected to the summing unit 42.

In the preferred embodiment, the summing unit 42 is a standard binary counter, the tri-state buffers 44 and 46 have three buffers, only one of which is active at a given time. The dual port memory means 36 is shown in FIG. 3 as first memory unit 56 and second memory unit 58, which units are high-speed bi-polar memory integrated circuits.

As shown in FIG. 3, the microprocessor means 38 comprises a microprocessor 60 which is operatively connected to first and second multiplexers 64 and 68, an output 70 of the multiplexer 64 being connected to the first memory unit 56 and an output 72 of the second multiplexer 68 is connected to the second memory unit 58 of the dual port memory means 36.

The timing means 39 comprises a timer and a collection memory configuration control. The timing means 39 sets the collection interval and provides logic to the detector. At the end of the collection interval it informs the microprocessor means 38 that collection is completed and informs the dual port memory means 36 to reconfigure itself to the other memory unit with the microprocessing means 38 clearing the previous memory unit.

The multiplexers 64 and 68 are operatively connected to a channel address generator 74. The multiplexers 64 and 68 gate the proper addresses in digital form of the digital channels either from the microprocessor 60 or the channel address generator 74 to the dual port memory means 36 depending on the configuration.

A low-level multiplexer 75 interfaces with the timing means 39, and strobes the analog-digital-analog converters 30 for proper placement of information within the 96 channel time slots. It will also be utilized to strobe the appropriate elements of the present invention. That is, the Answer Supervision Card (ASC) uses the same timing pulses so it knows when the analog-digital-analog converters 30 are putting data on the bus so it knows when to strobe the threshold detector 32 to evaluate the data and identify its associated channel. It is to be noted that the threshold detector 32 receives four of the most significant bits (MSB) from each PCM word of each of the channels. These most significant bits are paired with digital reference signals to determine if the PCM sample is above or below the reference level corresponding to −45 db. The digital reference signal may be dynamically changeable to adjust thresholds once a particular type of supervision is determined.

The output of the threshold detector 32 is coupled to the counter means 34 for counting those indications where the PCM bits rise above the threshold reference signal.

The counter means is in turn coupled to a dual port memory means 36 for storing the counts until collection is complete. 160 successive PCM words of each channel are judged against the threshold reference signal during one 20 ms collection interval. Upon termination of a collection interval, the dual port memory means 36 re-configures itself such that the second port is activated for collecting while the port containing the previous interval data is now accessible by the microprocessor 38. The microprocessor 38 then reads the count totals for each of the 96 channels and based upon the value of this count, a decision is made to determine if sufficient energy is present to signify a legitimate signal. The microprocessor 38 also clears out the collection memory in preparation for the next interval.

Essentially, knowing the various interruptions per minute associated with each of the tones, the microprocessor 38 is able to analyze a series of count values, on a per channel basis, and make a valid decision regarding the type of tone detected based on its repetition rate. These tones are then reported to the host microprocessor 40 when changes are detected. The answer supervision controller also responds to requests from the host microprocessor 40, such as threshold update requests for status, and initiation of detection.

The invention is not limited to the particular details of the circuit depicted, and other modifications are contemplated. Certain other changes may be made in the above described circuit without departing from the true spirit and scope of the invention herein involved. It is intended, therefore, that the subject matter in the above depiction shall be interpreted as illustrative and not in a limited sense.

The invention is claimed as follows:

1. In a telecommunication supervision system for evaluating the status of an input signal from a communication channel, said signal having one of a plurality of different cadences, the system comprising:
    detection means receiving the input signal from the communication channel and outputting channel signal when the input signal has an energy level exceeding a threshold reference; and
    means for analyzing periods between interruptions of said output signal to determine the identity of the particular cadence of the input signal.

2. The system described in claim 1 wherein said system further comprises a counting means operatively connected to said detection means for counting the channel signals during a pre-determined collection interval, said counting means having first and second outputs.

3. The system described in claim 2, wherein said system further comprises a dual port memory means having first and second inputs for storing the counted number of detectable signals during a collection interval, said first input being connected to said first output of said counter means and said second input being connected to said second output of said counter means.

4. The system described in claim 3, wherein said system further comprises a timing means operatively connected to said detecting means, analyzing means, counter means and memory means, causing only a first input to be received during a first collection interval, and causing only a second input to be received during a second collection interval.

5. A telecommunication supervision system for use with a multi-channel pulse code modulated bus having one or more different detectable pulse code modulated signals, one or none of the detectable signals appearing on one or more channels of the bus, the system comprising:
    microprocessor means;
    threshold detector means receiving the detectable signals from the channels of the bus and receiving a threshold reference signal from said microprocessor means for comparing the detectable signals to said threshold reference signal, said threshold detector means outputting a channel signal when a detectable signal appears on a channel during a collection interval having an energy level exceeding the threshold reference signal, said detector means outputting said channel signal independent of the frequency of said detectable signal;
    counter means receiving said channel signals from said threshold detector for counting the detectable signals on each of the channels which exceed said threshold reference signal during a collection interval, said counter means having first and second outputs;
    dual port memory means having first and second inputs for storing the counted number of detectable signals on each of the channels during a collection interval, said first input being connected to said first output of said counter means and said second input being connected to said second output of said counter means, said dual port memory means also being operatively connected to timing means operatively connected to said microprocessor means, detector means, counter means and memory means, and said timing means causing only such first input to be received during a first collection interval, and causing only a second input to be received during a second collection interval; and wherein said microprocessor means analyzes periods between interruptions of the counted number of detectable signals of each channel contained in one of said first or second memory units of said dual port memory means while the other of said memory units receives from one of the said first or second outputs of said counter means whereby said microprocessor means identifies the particular detectable signal on each of the channels of the multi-channel bus for one or more collection intervals, as well as identifying the absence of a detectable signal.

6. The system described in claim 5, wherein said threshold detector means is a digital comparator for comparing two digital signals, said two digital signals being the detectable pulse code modulated signals, and said threshold reference signal.

7. The system described in claim 5, wherein said counter means comprises a summing means for receiving said channel signals, first and second tri-state buffers operatively connected to said summing means and to said microprocessor means, and a multiplexer operatively connected to an output of each of said first and second tri-state buffers, said multiplexer having an output connected to said summing means.

8. The circuit described in claim 7, wherein said summing means is a binary counter.

9. The system described in claim 7, wherein said tri-state buffer comprises three buffers, only one of which is active at any given time.

10. The system described in claim 5, wherein said dual port memory means are high-speed bi-polar memory integrated circuits.

11. The system described in claim 6, wherein the microprocessor means comprises:

a microprocessor; and first and second multiplexers operatively connected to said microprocessor, an output of one of said multiplexers being connected to said first memory unit of said dual port memory means, and an output of said second multiplexer being connected to said second memory unit of said dual port memory means.

12. The system described in claim 6, wherein said collection interval is approximately 20 milliseconds.

13. The system described in claim 6, wherein said detectable signals comprise 160 PCM samples for each channel during said predetermined interval.

14. In a telecommunication supervision system for evaluating the status of an input signal from a communication channel, said signal having one of a plurality of different cadences, the system comprising:

detection means receiving the input signal from the communication channel and outputting a channel signal when the input signal has an energy level exceeding a threshold reference, said detection means outputting said channel signal independent of the frequency of said input signal; and meanss for analyzing periods between interruptions of the channel signal to determine the identity of the particular cadence of the input signal.

* * * * *